United States Patent [19]
Fujiwara

[11] 3,757,821
[45] Sept. 11, 1973

[54] DISK TYPE ELECTROMAGNETIC VALVE

[76] Inventor: Katsuji Fujiwara, 191 Mishitani, Hiraoka-cho, Kakogawa, Hyogo-ken, Japan

[22] Filed: Dec. 22, 1971

[21] Appl. No.: 210,707

[30] Foreign Application Priority Data
Jan. 13, 1971 Japan ............ 46/675 (utility model)
Mar. 11, 1971 Japan ....... 46/13299 (utility model)
June 22, 1971 Japan ....... 46/54537 (utility model)

[52] U.S. Cl.................. 137/625.48, 251/30, 251/43
[51] Int. Cl............................................. F16k 31/40
[58] Field of Search.......................... 251/30, 43, 44; 137/625.48

[56] References Cited
UNITED STATES PATENTS
203,947  5/1878  Saunders............................ 137/608
1,005,703  10/1911  Goeddel.............................. 251/43
2,160,117  5/1939  Borresen........................... 251/30 X
2,329,001  9/1943  Robinson........................... 251/30 X
3,218,022  11/1965  Lewis............................... 251/141 X
3,381,932  5/1968  O'Kane............................... 251/30

*Primary Examiner*—Arnold Rosenthal
*Attorney*—Toren and McGeady

[57] ABSTRACT

A disk type electromagnetic valve comprising a disk valve floatingly arranged within a pressure chamber which is formed by a main body and a cover member, the opening and closing of the disk valve are hydrodynamically effected, and the pressure exerted from behind said disk valve for closing it is controlled by opening and closing a pilot valve under the influence of a small-type solenoid.

7 Claims, 3 Drawing Figures

INVENTOR
KATSUJI FUJIWARA

BY Toren and McGrady
ATTORNEY

DISK TYPE ELECTROMAGNETIC VALVE

BACKGROUND OF THE INVENTION

In a conventional pilot type electromagnetic valve, a piston-cylinder mechanism, a diaphragm, a "Bellofram," a bellows and the like are used at the main valve portion. However, in the piston-cylinder mechanism, high accuracy finishing is required and, such as O-rings and the like, should be used at its sliding portion, so that the frictional resistance becomes larger, and smooth sliding function is not assured, and working fluid is considerably limited due to the use of the sealrings, and results in a large question in respect of its durability. While, in the diaphragm or the "Bellofram," the working range thereof is limited with the result that it is unsuitable for a large capacity, and in the bellows, the cost of production becomes higher, thus all of the structures are complex, and the shape of whole valve becomes larger and the assembly as well as the maintenance thereof becomes more difficult, therefore its practicability is deficient.

Further, the above pilot type electromagnetic valve is so constructed that opening and closing of the main valve are effected by the pressure difference between the upper and lower faces of the main valve according to the opening and closing of a pilot valve, so that at the time of valve opening, the main valve trembles violently due to flow resistance or change of dynamic pressure and the like caused by exhausting fluid, and is very unstable and also it is very difficult to obtain a sufficient flow.

SUMMARY OF THE INVENTION

This invention relates to disk type electromagnetic valves, which can open a valve port having large aperture according to the opening and closing of a pilot valve by a small-type solenoid.

It is an object of this invention to eliminate the aforementioned disadvantages by the provision of a disk type electromagnetic valve, which is simple in construction, is easy to assemble and maintain, and is economical.

Accordingly, the present invention provides a electromagnetic valve, wherein at a main valve portion, a disk valve working hydrodynamically, is used, and the pressure (within a pressure chamber) which exerts its force from behind the disk valve for closing the same is controlled by the opening and closing of a pilot valve under the influence of a small-type solenoid, thus, opening and closing of the disk valve are effected.

Therefore, the high accuracy finishing is not necessary and the working fluid is not limited such as in the case of conventional valve, and a valve port having a large aperture can be opened by a small-type solenoid.

Another object of this invention is to obtain a disk type electromagnetic valve which can be kept in a stable state when it is opened.

DESCRIPTION OF THE PREFERRED EMBODIMENTS

Figure 1:
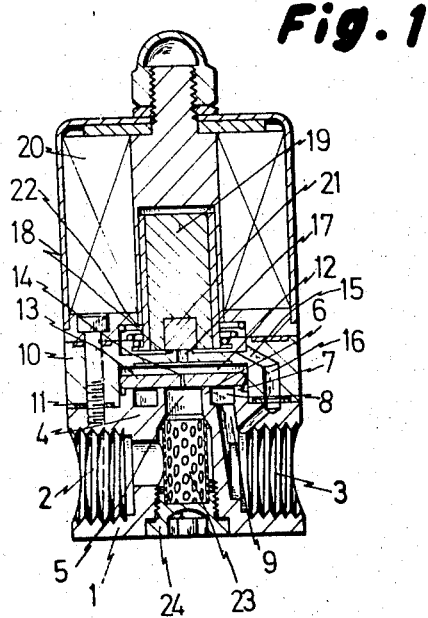
FIG. 1 is a longitudinal section showing an embodiment of the present invention.

In FIG. 1, a main body 1 is provided with an inlet port 2, an outlet port 3 and a valve seat portion 4. On the central portion of the valve seat portion 4, an inflow port 5 communicating with the inlet port 2 is provided, and around the inflow port 5, an inner and an outer annular valve seat 6, 7 is provided and between these valve seats 6, 7, an annular groove 8 is provided, and further the annular groove 8 communicates with the outlet port 3 through an exhaust port 9. On the valve seat portion 4 of the main body 1, a cover member 10 is attached through a packing 11, whereby a pressure chamber 12 is formed. In the pressure chamber 12, a disk valve 13 is floatingly arranged, and the disk valve 13 is provided with an orifice 14 communicating between the pressure chamber 12 and the side of the inlet port 2 at the time of valve closing, and, further, a very small clearance is kept between the disk valve 13 and an inner wall of the cover member 10 and the periphery of disk valve 13 is chamfered so as to prevent the disk valve 13 from being caught by the inner wall of the cover member 10, and so as to be able to open and close smoothly.

In the cover member 10, a pilot port 17 communicates between the pressure chamber 12 said the side of the outlet port 3 through passage (15 or 16), and a pilot valve seat 18 is provided around the pilot port 17.

Further, on the upper cover member 10, a solenoid 20 containing a movable core 19 is attached, and on the lower end of the core 19, a pilot valve 21 is arranged. A spring 22 energizes the core 19 in the closing direction of the pilot valve.

Thus, opening and closing of the pilot port 17 is effected by up and down movement of the core 19 due to energizing and deenergizing of the solenoid 20. Additionally, the valve includes a screen 23, and a plug 24.

Next, the working of electromagnetic valve will be explained. Firstly, when the solenoid 20 is deenergized, the core 19 is pushed downwardly by the spring 22 and the pilot valve 21 is closed. Therefore, the pressure chamber 12 communicates with the side of the inlet port 2 through the orifice 14, so that the disk valve 13 is closed. Next, when the solenoid 20 is energized, the core 19 is attracted upwardly against the elastic force of the spring 22, and the pilot port 17 is opened. Accordingly, the pilot port 17 is preliminarily made larger than the orifice 14 of the disk valve 13, so that the pressure within the pressure chamber 12 becomes lower, thus the disk valve 13 is opened. Because the periphery of the disk valve 13 is chamfered, the disk valve 13 is smoothly opened without being caught by the inner wall of the cover member 10, and is pushed on the upper wall of said cover member 10. In this condition, the pressure exerted on the lower face of the disk valve 13 is larger than the pressure exerting on the upper face of the disk valve 13, so that it is possible to keep a very stable opening condition, and even if the disk valve 13 receives flow resistance by exhausting fluid, the disk valve 13 would never tremble.

In order to close the valve again, it is sufficient to cut off the current in the solenoid 20, then the solenoid 20 is deenergized and the pilot port 17 is closed. Thus, the pressure exerted on the upper face of the disk valve 13 becomes higher, while the pressure exerted on the lower face of the disk valve 13 becomes lower in accordance with Bernoulli's theorem, so that the disk valve 13 is attracted to the valve seat for closing the valve. In such a manner, the opening and closing of the disk valve 13 is effected.

In this embodiment, the disk valve 13 is provided with the orifice 14 so as to be able to supply the pressure into the pressure chamber 12 in order to prevent the opening of valve due to a pressure drop within the pressure chamber 12 in case of a leak from between the disk valve 13 and the outer annular valve seat 7, however, when the disk valve 13, the inner annular valve seat 6 and the outer annular valve seat are finished minutely, a similar effect may be obtained without the orifice 14.

The construction of this embodiment is such that when the solenoid 20 is deenergized, the disk valve 13 is closed, and when the solenoid 20 is energized, the disk valve 13 is opened.

Figure 2:
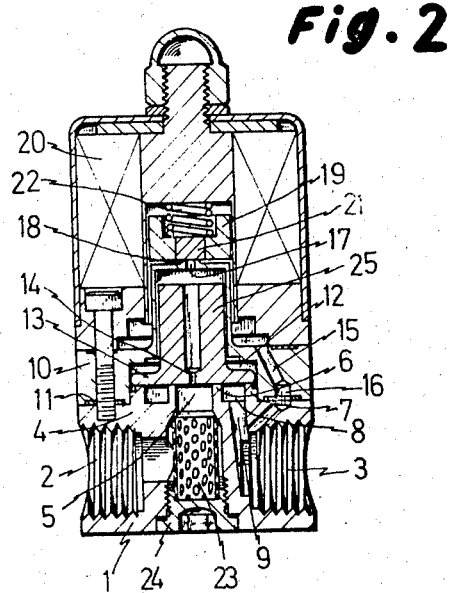
FIG. 2 is a longitudinal section showing an alternate embodiment of the present invention.

In the embodiment shown in FIG. 2, the disk valve 13 is provided with a protrusion 25, and, when the disk valve 13 is opened, the protrusion 25 is positioned within the magnetic field of the solenoid 20, thus the disk valve 13 is attracted by the solenoid 20, and the valve is kept open. Therefore, the valve is opened in a very stable state, and sufficient flow may be obtained.

Figure 3:
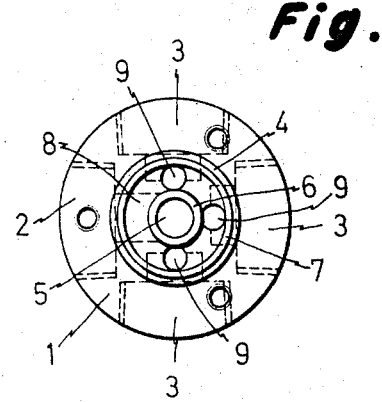
FIG. 3 is a plan of a main body showing still another embodiment of the present invention.

Further, when a main body having three discharge ports 3 as shown in FIG. 3 is used, it is possible to discharge and intercept in three ways according to opening and closing of the disk valve at the same time, and, moreover, it is possible to discharge and intercept in plural ways by changing the number of the discharge ports.

In this manner, the electromagnetic valve, according to the present invention, is constructed so that the disk valve effected hydrodynamically is used as a main valve portion, and the pressure exerted from behind the disk valve for closing the same is controlled by the opening and closing of the pilot valve under the influence of a small-type solenoid, thus the opening and closing of the disk valve is effected, and the disk valve is provided with an orifice communicating between the pressure chamber and the side of the inlet port so as to keep the valve closing force when the valve is closed, and, further, a considerable small clearance is kept between the disk valve and an inner wall of the cover member, and the periphery of disk valve is chamfered so as to prevent the disk valve from being caught by the inner wall of the cover member.

Therefore, at the main valve portion, a complex sliding portion such as a conventional piston-cylinder mechanism and a seal-ring such as a O-ring and the like are not used, so that the opening and closing of the disk valve is smoothly effected without any frictional resistance as well as without any limit due to the working fluid.

Further this electromagnetic valve is simple and without any complex construction such as a bellows, a diaphragm, or a "Bellofram" so that its cost is low its manipulation and maintenance is convenient.

What is claimed is:

1. A disk type electromagnetic valve comprising a main body, said main body including an inlet port, an outlet port spaced from said inlet port and a surface forming a valve seat portion, said main body forming an inflow port in said surface forming the valve seat portion and a passage connecting said inflow port to said inlet port, said surface including an annular valve seat extending about said inflow port and an outer annular valve seat spaced radially outwardly from said inner annular valve seat, an annular groove formed in said surface and located between said inner annular valve seat and said outer valve seat, said main body forming an exhaust port and passage connecting said annular groove and said outlet port, a cover member secured to said main body and covering said surface forming the valve seat portion and forming in combination therewith a pressure chamber containing said inner and outer annular valve seats, a disk valve floatingly positionable within said pressure chamber and displaceable between a first position in contact with said inner and outer annular valve seats and a second position spaced from said inner and outer valve seats, said disk valve having a periphery which is chamfered and spaced closely from the juxtaposed surface of said cover member forming the lateral surface of said pressure chamber and providing a small clearance therebetween, said cover member including a pilot port in communication with said pressure chamber and a through passage arranged in communication with said outlet port and said pilot port, a solenoid assembly including a core and a pilot valve secured to said core, said pilot valve being coaxially disposed relative to said disk valve, said pilot valve being arranged to open and close said pilot port at the end thereof opposite said pressure chamber ends in response to the energizing and deenergizing of said solenoid assembly for selectively admitting flow between said pilot port and said through passage so that the pressure within said pressure chamber is controlled to effect the opening and closing of said disk valve.

2. A disk type electromagnetic valve, as set forth in claim 1, wherein said disk valve has an orifice therethrough communicating between the inflow port side of said pressure chamber and said pilot port side of said pressure chamber so that said pressure chamber is in communication with said inflow port when said disk valve is in its first position.

3. A disk type electromagnetic valve, as set forth in claim 2, wherein the diameter of the said orifice in said disk valve is less than the diameter of said pilot port.

4. A disk type electromagnetic valve, as set forth in claim 1, wherein said solenoid assembly when energized has a magnetic field, said disk valve located within the magnetic field of said solenoid assembly so that said disk valve is displaced into its open position when said solenoid assembly is energized.

5. A disk type electromagnetic valve, as set forth in claim 4, wherein said disk valve includes a protrusion on the side thereof opposite said inflow port and said protrusion extends in the direction of movement of said valve disk away from said inflow port and is positioned within the magnetic field of said solenoid assembly.

6. A disk type electromagnetic valve, as set forth in claim 1, wherein said solenoid assembly includes spring means associated with said core for biasing it in a direction opposite to the direction in which it is biased by the energizing of said solenoid assembly.

7. A disk type electromagnetic valve, as set forth in claim 1, wherein said main body has a plurality of outlet ports.

* * * * *